United States Patent [19]

Juds et al.

[11] Patent Number: 5,675,326
[45] Date of Patent: Oct. 7, 1997

[54] METHOD OF DETERMINING OPTIMAL DETECTION BEAM LOCATIONS USING REFLECTIVE FEATURE MAPPING

[75] Inventors: Scott Juds, Seattle; Paul Mathews, Langley, both of Wash.

[73] Assignee: Auto-Sense, Ltd., Boulder, Colo.

[21] Appl. No.: 485,099

[22] Filed: Jun. 7, 1995

Related U.S. Application Data

[63] Continuation-in-part of Ser. No. 883,804, May 13, 1992, which is a continuation of Ser. No. 508,388, Apr. 11, 1990, abandoned.

[51] Int. Cl.⁶ .................................................. G08G 1/16
[52] U.S. Cl. ...................... 340/904; 340/903; 340/435; 340/436; 340/555; 340/556; 180/167; 364/461; 356/2
[58] Field of Search ............................ 340/904, 903, 340/435, 556, 961, 555, 436; 180/167, 271; 367/93, 94, 909; 343/27–29, 41; 356/2, 3; 364/461

[56] References Cited

U.S. PATENT DOCUMENTS

| | | | |
|---|---|---|---|
| 3,681,750 | 8/1972 | Larka | 340/904 |
| 4,028,662 | 6/1977 | Young | 340/904 |
| 4,339,748 | 7/1982 | Guscott et al. | 340/555 |
| 4,447,800 | 5/1984 | Kasuya et al. | 340/904 |
| 4,450,430 | 5/1984 | Barishpolsky et al. | 340/904 |
| 4,479,053 | 10/1984 | Johnston | 340/555 |

*Primary Examiner*—Donnie L. Crosland
*Attorney, Agent, or Firm*—David A. Greenlee

[57] ABSTRACT

A method of defining a sensing system for detecting the presence of an object in a volume of space under surveillance by determining the optimal placement of a plurality of energy beams which are projected into the volume which comprises the steps of (A) placing the object at a preselected position within the space; (B) directing a plurality of sample beams of energy, which have a predetermined orientation, from a source onto the object; (C) detecting the reflections of the sample beam energy from points on the object by energy detectors; (D) recording the preselected position of the object, the predetermined orientation of sample beams, and the detection status of the energy detectors; (E) changing the equatorial and azimuthal angles of each of the beams and repeating steps (B), (C) and (D); (F) moving the source of the sample beams relative to the object; (G) repeating steps (B) through (F) to produce spatial maps of the locations at which the object is positioned when each of the energy detectors detect reflected sample beam energy; and (H) using the spatial maps so produced to select the optimal orientation of a set of energy beams which will maximize the detection probability of an object located in the volume of space under surveillance. This method is repeated for a plurality of different vehicles.

20 Claims, 10 Drawing Sheets

METHOD OF DETERMINING OPTIMAL DETECTION BEAM LOCATIONS USING REFLECTIVE FEATURE MAPPING

RELATED APPLICATIONS

This is a continuation-in-part application of prior application Ser. No. 07/883,804, filed May 13, 1992, which is a file wrapper continuation of Ser. No. 07/508,388, filed Apr. 11, 1990, which is now abandoned.

TECHNICAL FIELD

The present invention generally relates to three-dimensional mapping techniques, and more particularly with a method of determining the optimal number and placement of a plurality of energy beams used to detect the presence of an object within a space under surveillance to define a sensor system for detecting the presence of objects in that space. Furthermore, it relates to a method for quantifying the performance of a sensor system used to detect the presence of an object within a space under surveillance by using mapping techniques to determine the aggregate detection coverage within the space under surveillance. Furthermore it relates to a method of defining a sensor system.

BACKGROUND OF THE INVENTION

Several technologies are known for use in detecting the presence of an object entering a volume of space under surveillance. These energy beams may comprise, for example, radio frequency energy (microwaves), sound waves (ultrasonics), or optical energy (e.g., infrared waves). One application of such technology involves collision avoidance systems used in on-the-road vehicles to detect the presence of an adjacent vehicle or object which poses a risk of collision. Each of the technologies mentioned above possess certain advantages and limitations, but all of them present certain common problems in their implementation for a specific application. For example, such collision avoidance systems are typically employed to monitor a specific volume of space immediately adjacent the "host" vehicle to be protected. Energy having unique characteristics, e.g. wavelength, modulation frequency, etc., is projected from the host vehicle into the space, and reflections of this energy toward the host vehicle are monitored to detect the presence of a vehicle or other object presenting a risk of danger. However, cost, size and other constraints impose practical limits on the amount of energy that can be projected into the monitored space; therefore, it is necessary to project the energy in a limited number of energy beams which normally cover only a portion of the volume being monitored.

Since only a limited number of energy beams may be employed in most collision avoidance systems, it is therefore important to judiciously choose the number, size and placement of the beams so as to maximize the likelihood of detection. This task is substantially complicated by several factors. For example, the size, geometry and features of the various vehicles which might enter the monitored zone vary widely, and therefore each present unique reflective characteristics. Also, adjacent curbing, road features and reflective road striping have the potential to reflect energy and therefore may result in false detections. On the other hand, the monitored volume of space must be sufficiently "covered" with beam energy so that smaller objects and vehicles, such as motorcycles and pedestrians, may be reliably detected.

Accordingly, there is a need in the art for a method of defining a sensor system by determining the optimal number and placement of a plurality of energy beams employed to detect the presence of an object within a volume of space under surveillance, particularly such energy beams used in collision avoidance systems for vehicles, and furthermore to quantify the performance of sensor systems composed of one or more of such energy beams.

SUMMARY OF THE INVENTION

It is an object of the present invention to provide a method for determining the optimal number and placement of a plurality of energy detection beams employed to detect the presence of an object, such as a vehicle within a volume of space under surveillance.

Another object of the invention is to provide a method of the type described above which provides a set of data allowing selection of the number and placement of the energy beams in a manner to reliably detect any of a plurality of objects, such as vehicles, having differing physical features and geometrical configurations to define a sensor system.

Yet another object of the invention is to provide a method as described above which produces a map of the detection locations in the volume of space used to optimize the number and coverage of detected beam reflections.

A further object of this invention is to provide a method for quantifying the performance of a sensor system used to detect the presence of an object within a space under surveillance by using mapping techniques to determine the aggregate detection coverage within the space under surveillance.

According to one aspect of the present invention, a method of determining the optimal positions of a plurality of detection energy beams within a volume of space under surveillance comprises the steps of: (A) placing the object at a preselected position within the space; (B) directing a plurality of sample beams of energy, which have a predetermined orientation, from a source onto the object; (C) detecting the sample beam energy reflected from points on the object by energy detectors; (D) recording the preselected position of the object, the predetermined orientation of sample beams, and the detection status of the energy detectors; (E) moving the source of the sample beams relative to the object; (F) repeating steps (B) through (E) to produce spatial maps of the locations at which the object is positioned when each of the energy detectors detect reflected sample beam energy; and (G) using the spatial maps so produced to select the optimal orientation of a set of energy beams which will maximize the detection probability of an object located in the volume of space under surveillance.

According to another aspect of the invention, a method is provided for automating the selection of a subset of possible energy beam orientations from a larger set of possible beam orientations for which data has been acquired, comprising the steps of (A) compiling a list of sample energy beams in relative order according to the total number of detections of beams reflected from an object within the volume of space under surveillance; (B) selecting the beam having the highest number of detections; (C) compiling another list of the remaining sample energy beams in relative order according to the total number of detections of beams reflected from an object within the volume of space under surveillance that are non-duplicative of the detections of any selected beam; (D) selecting the remaining beam having the highest number of detections that are non-duplicative of the detections of any selected beam; and (E) repeating steps (B), (C) and (D) a predetermined number of times to produce a combined detectivity map of all detections of all selected beams.

According to still another aspect of the invention, a map of the locations in a volume of space under surveillance where an object is detected by detecting reflections of at least one sample beam of energy directed into the volume of space by a sensor system located at a reference area is produced by (A) placing the object at a predetermined location within the volume of space; (B) locating the sensor system at a selected reference area; (C) directing at least one sample beam of energy waves from a reference area onto the object within the space; (D) detecting the energy reflected back to the reference area from the object; (E) recording the reference area and the detection of energy on a map of the space under surveillance; (F) relatively moving the sensor system and the object to locate the sensor system at a different selected reference area; and (G) repeating steps (C), (D), (E) and (F) a predetermined number of times to create said map.

According to yet another aspect of the invention, a method of quantifying the performance of a sensor system used to detect the presence of an object in a volume under surveillance where the object is detected by detecting reflections of at least one sample beam of energy directed into the volume of space by a sensor system, comprising the steps of (A) placing the object at a plurality of uniformly spaced locations within the volume; (B) directing a plurality of sample beams of energy from the sensor system into the volume; (C) recording the detection status of the reflections of the beams on a map of the volume for each of the locations within the volume to determine the number of detections; and (D) calculating the percentage of detections to quantify the performance of a sensor system.

The methods are preferably carried out using a plurality of sample beams of infrared energy. The sensing system and the object under surveillance are relatively moved in each of a plurality of linear, parallel paths so that reflections are sensed at a plurality of locations over the area under surveillance. A data base of the effectivity of each of the possible sample beams of energy is created by repeating this process with the sample beams of energy oriented in different vertical and horizontal positions of interest to determine object beam reflectivity at a plurality of angles of incidence. The recorded data are employed to produce a composite map of the locations in space where reflections have been noted. The map of reflective features may then be used to determine the optimal number and placement of a limited number of detection beams, or in the case of a sensing system, to determine a measure of system performance.

BRIEF DESCRIPTION OF THE DRAWINGS

In the drawings, wherein like reference numerals are employed to designate identical components and which are to be used in conjunction with the following description.

DETAILED DESCRIPTION OF THE PREFERRED EMBODIMENT

The present invention generally relates to a method of determining the optimal number and placement of energy beams which are used to detect the presence of an object within a zone to be monitored. One such application of object detection requiring strategic placement of the energy beams is in the context of collision avoidance systems for vehicles, where it is desired to determine the presence of another vehicle, pedestrian or other object which is within a zone of danger relative to a protected vehicle and poses a risk of collision therewith.

Figure 1:
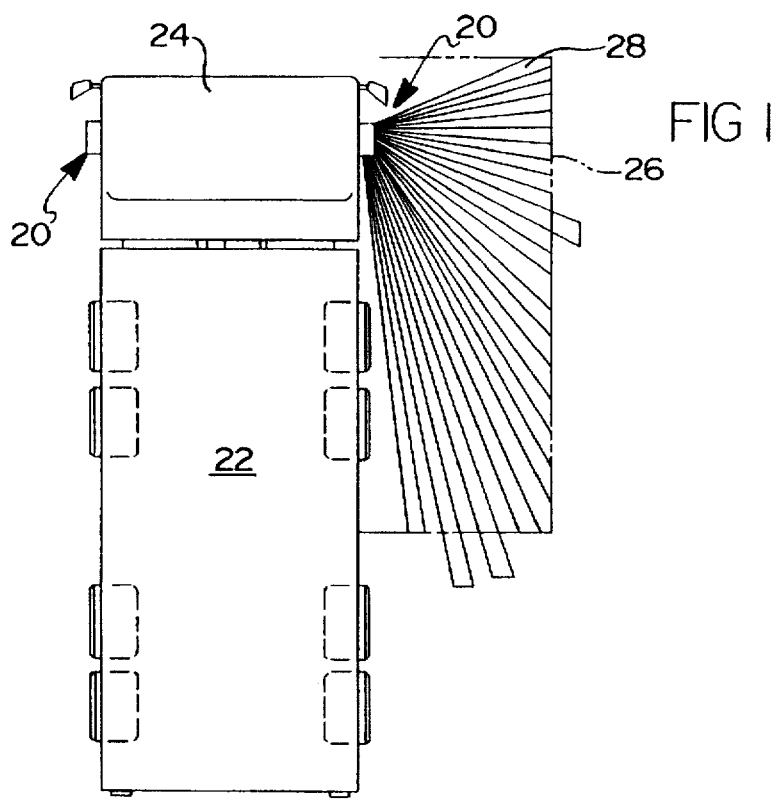
FIG. 1 is a plan view of a host vehicle equipped with a detection module forming part of a collision avoidance system and showing the approximate volume of space under surveillance.
Figure 2:
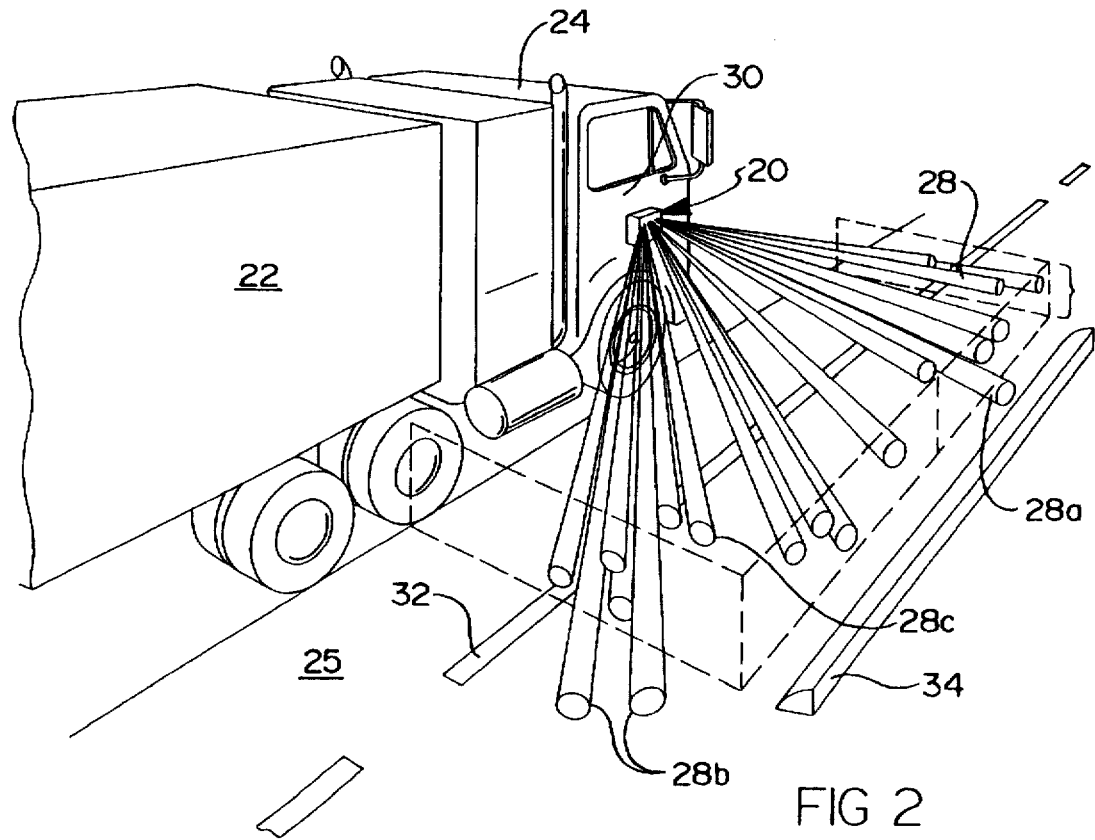
FIG. 2 is a perspective view of the right side of the vehicle shown in FIG. 1, and more clearly depicting the number and relative placement of the detection beams emanating from the detection module.
Figure 3:
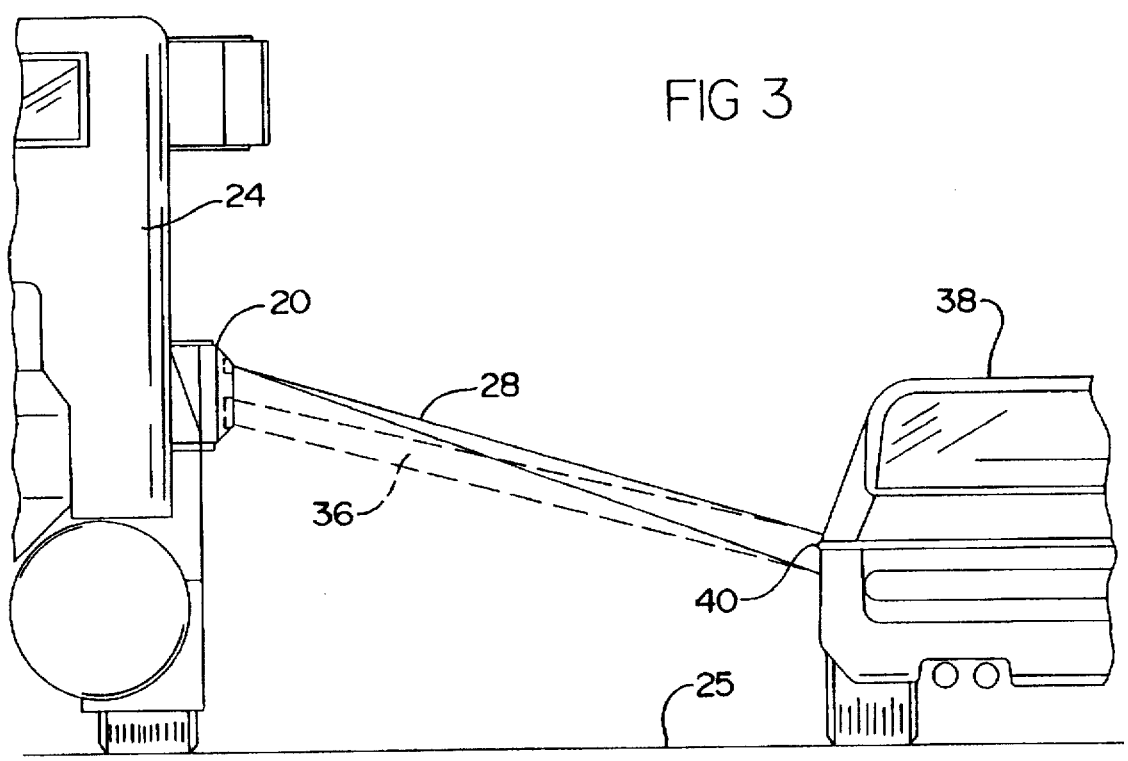
FIG. 3 is a rear elevational view of the host vehicle shown in FIG. 1, depicting in operative relationship to an adjacent vehicle to be monitored.

A typical collision avoidance system using multiple energy beams to detect adjacent objects is depicted in FIGS. 1–3. A tractor-trailer type vehicle is depicted which comprises a tractor or truck 24 that tows a long trailer 22. Large trucks of this type are typically referred to as "Class 8" trucks, and because of their size and configuration, the operator of such a vehicle normally has a relatively large blind spot within which an adjacent vehicle may be concealed from his view, thus presenting a severe hazard during lane-changing maneuvers, turns and the like. The collision avoidance system includes a collision avoidance detector 20 mounted on each side of the truck 54 and more particularly on the door 30 of the truck cab. The precise mounting location of the detector 20 will vary depending upon the nature, size and configuration of the truck or other "host" vehicle with which the detector 20 is used. In many applications, such as the truck 24, it may be unnecessary to employ a detector 20 on both sides thereof, and therefore only those energy beams 28 associated with the detector 20 on the right side of the truck 24 will be discussed herein.

The detector 20 emits a plurality of beams 28 of energy forwardly, laterally and rearwardly into a volume of space 26 which comprises the zone to be monitored for the presence of vehicles, pedestrians or other objects posing a risk of collision with the truck 24. The energy beams 28 may comprise acoustical energy (e.g., ultrasonics), radio frequency energy (e.g., microwaves), or optical energy (e.g., infrared light waves). In the disclosed embodiment, nineteen of the beams 28 are employed to detect objects within the monitored zone 26. The zone 26 under surveillance is generally rectangular in plan view and is of a preselected height. The dimensions and geometry of the monitored zone 26 are such that the volume of space monitored is above the surface 26 of striping 32 on the road and extends laterally to a point which falls short of curbs 34, signs (not shown) or other objects which are not intended to be detected.

The beams 28 emanate from the detector 20 and impinge upon objects, such as an adjacent vehicle 38 within the zone 26. A portion of the energy in the beam 28 is reflected from surface features such as the trim piece 40 on the adjacent vehicle 38, a portion of which energy is reflected in a beam 36 back to the detector 20. The spacing between, location, direction, size and number of the beams 28 must be carefully selected in accordance with a particular application to optimize system performance and to assure that all objects of interest within the zone 26 may be reliably detected. In some cases, it may be determined that certain of the beams 28, such as the lateral beam 28a and rearwardly projecting beams 28b, should extend beyond the normal monitoring zone 26 in order to detect certain unique surface features of adjacent vehicles such as trim components, license plates or the like. In any event, in a commercialized sensing application, it is important to use a relatively minimum number of the beams 28 to provide the required degree of detection reliability, since the use of additional beams may be unnecessarily costly and unnecessarily inhibit use of such a system while providing insignificant added detection reliability. The present invention is therefore concerned with determining the number and optimal placement, positioning and length of the beams 28 so as to assure high detection reliability at minimum cost.

Figure 4:
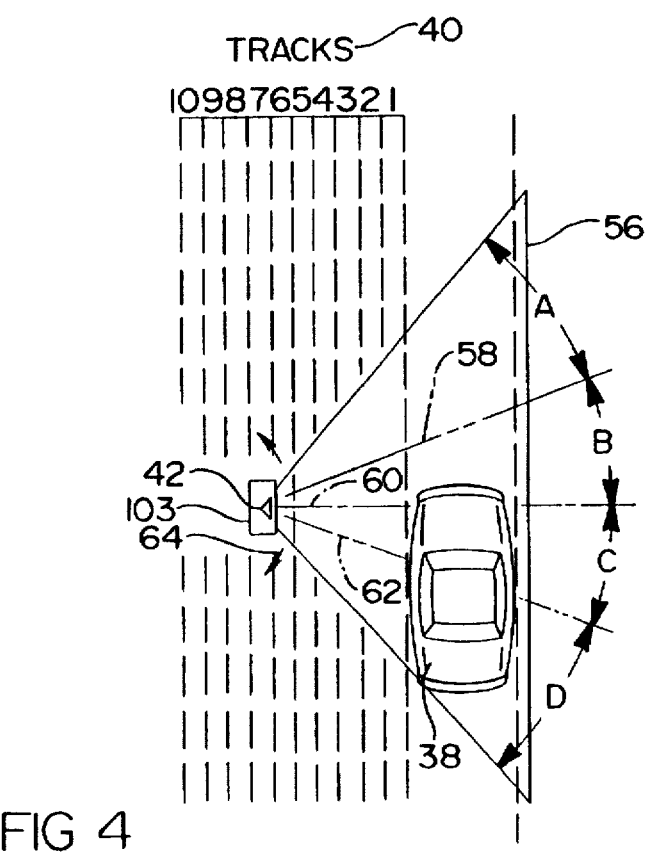
FIG. 4 is a diagrammatic plan view used to explain the method of the present invention.
Figure 5:
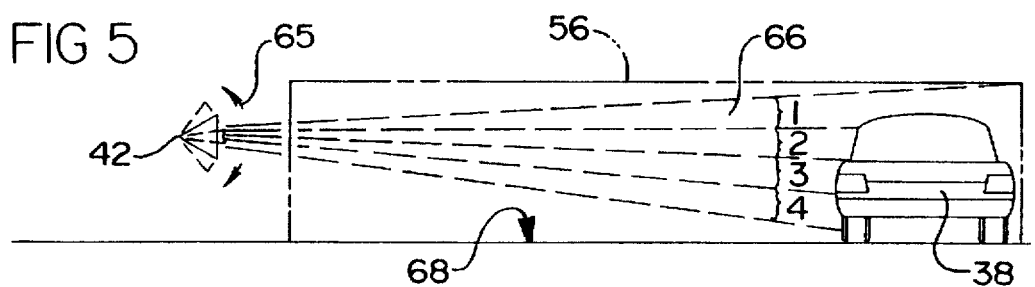
FIG. 5 is a rear elevational view of a vehicle disposed within a volume of space under surveillance which is of aid in explaining the method of the present invention.
Figure 6:
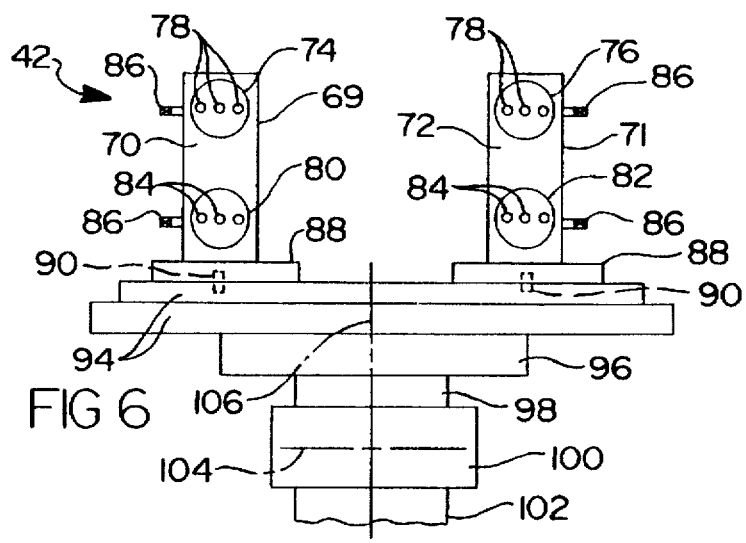
FIG. 6 is a front elevational view of apparatus employed to carry out the method of the present invention.
Figure 7:
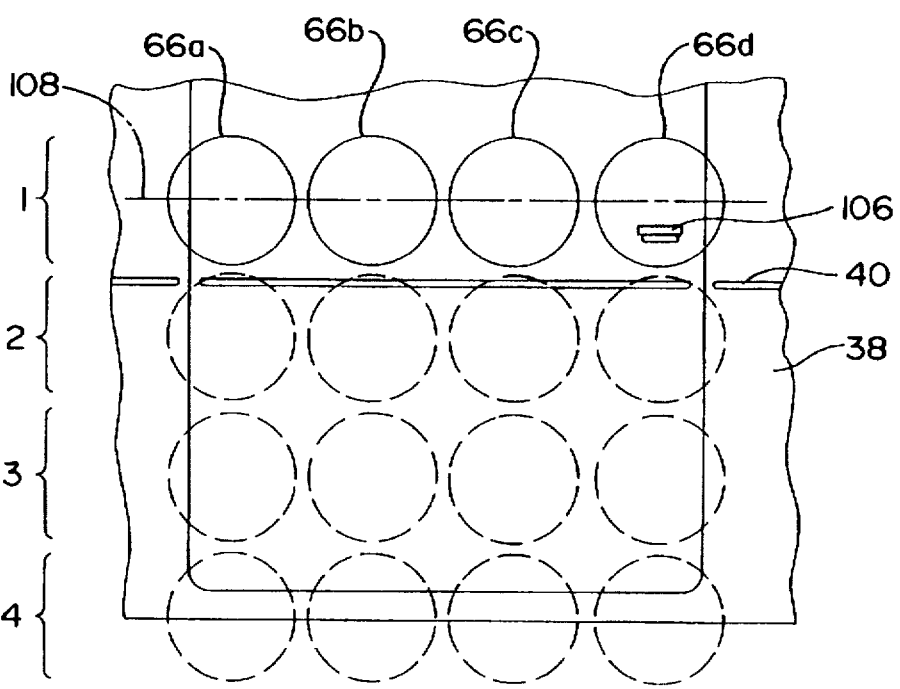
FIG. 7 is an elevational view of a portion of the side of a vehicle with a series of the sampling beams trained thereon, successively lower positions of the sampling beams being indicated in the phantom.
Figure 8:
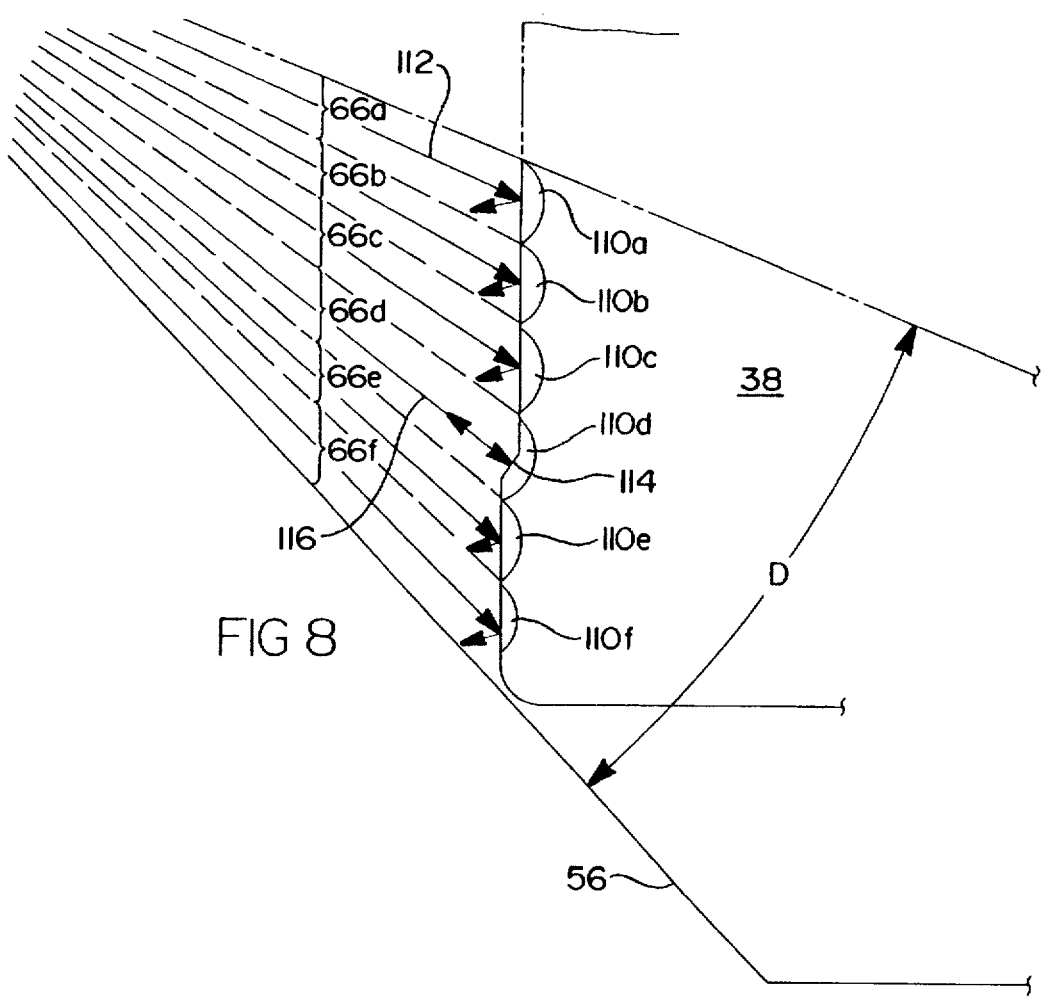
FIG. 8 is a diagrammatic, plan view showing the impingement of the sampling beams on the side of a vehicle.

Attention is now directed to FIGS. 4-8 which depict an arrangement for carrying out a novel method of determining the optimal position, placement, length and number of the beams 28. First, a detection envelope, or volume of space under surveillance, shown in solid line and designated by the numeral 56 in FIG. 4 is determined, which defines the area in plan view where it is desired to detect objects which might pose a risk of collision with the host vehicle 24. This would be the vehicle's so-called "blind spot" (i.e. volume of space not covered by viewing the vehicle's center and side rearview mirrors). The envelope 56 essentially possesses a configuration in plan view similar or identical to the zone 26 shown in FIG. 1. A source of sampling beam energy 42, comprising a system or plurality of individual sensors (later described in detail), is positioned at a point adjacent the detection envelope 56, essentially corresponding to the point on the host vehicle 24 where the detection unit 20 would ordinarily be mounted (see FIG. 1). In one suitable embodiment, the sampling beam source 42 produces six horizontally aligned beams 66 of energy, for example, optical energy of the infrared wavelength. Four of such beams 66a-66d are depicted in FIG. 7 as impinging on the door of an adjacent vehicle 38. In the present embodiment, the beams 66 are of circular cross-section and, as shown in FIG. 8, impinge upon the side of the vehicle 38 as contiguous or closely adjacent circular spots 110a-110f.

For purposes of carrying out the method of the present invention, the detection envelope 56 is divided by sector lines 58-62 into four sections respectively subtended by essentially equal angles A-D. The sampling beam source 42 is shown in more detail in FIG. 6 as comprising two photodetector modules 69, 71. Sets of three horizontally aligned light-emitting diodes (LEDs) 78 are mounted behind lenses 74, 76 on optical supports 70, 72.

Two sets of three photosensors or photodetectors 84 are likewise mounted behind lens 80, 82 which are disposed on the optical mount 70, 72. Each LED 78 is paired with a photosensor 84 to form a sensor system. Thus, FIG. 6 illustrates two photodetection modules 69, 71, each of which has three sensor systems comprising an LED 78 and photosensor 84 pair. The precise aiming of the LED 78 and photosensor 84 pairs may be controlled by any suitable means such as micrometer adjustments 86.

The optical mounts 70, 72 are respectively secured to bases 88, which in turn are independently pivotally mounted for rotation on pivot pins 90 about substantially vertical axes on a common support assembly 94. The support assembly 94, in turn, is mounted on a base 96 which may be rotated about a substantially vertical axis 106. The base 96 is coupled by a joint 98 to a bearing assembly 100 which is rotatable about a substantially horizontal axis 104. The bearing assembly 100 is in turn mounted on a suitable support 102 which is mounted on a movable cart 103 that will be described in detail later. It may thus be appreciated that the optical mounts 70, 72 may be rotated about their vertical axes to achieve alignment between the two sets of respectively associated horizontal beams, and rotation about the horizontal and vertical axes 104.106 allows precise aiming of the horizontal envelope 56. More particularly, it can be appreciated that the bank of six horizontal beams may be pivoted about a horizontal axis in the direction of arrow 64 (FIG. 4) to any of a plurality of indexing positions through an angle which will be referred to herein as the "equatorial" angle. Likewise, it may be appreciated that the bank of six beams 66 may be rotated about a vertical axis 104 in the direction of arrow 65 (FIG. 5) to any of a plurality of second index positions through angles which will be referred to herein as "azimuthal" angles.

After the beam source 42 is disposed in the proper position adjacent the envelope 56, it is rotated about a horizontal axis to a first equatorial angle in one of the sectors, such as sector D, at a given azimuthal angle. For example, as shown in FIG. 5, the first azimuthal angle may correspond to the level indicated by the numeral 1, so that the beams effectively illuminate upper portions of the vehicle 38.

With the beam source 42 positioned at the first combination of equatorial and azimuthal angles, the cart 103 is moved along a first track 40 designated as track 1 to a first position where a portion thereof, for example, is within sector D. With the beam source 42 aimed at sector D, the LEDs 78 are pulsed to produce horizontal bank of beams 66. Those of the beams 66 which are incident on the surface of the vehicle 38 result in illumination spots, such as those designated by the numerals 110a–110f in FIG. 8. Depending upon the geometry and nature of the surface features thusly illuminated, a portion of the incident energy will be reflected back toward the beam source 42 and is picked up by the photosensors 84. In other words, those particular illuminated surface features on the vehicle 38 which are disposed at certain angles relative to the beam source 42 or certain colors will reflect a portion of the incident beam at the proper angle back toward the beam source 42 so that the beam source 42 effectively "sees" or detects such reflective feature or surface area.

The precise beam position for each such reflection produced by a surface feature and the cart position are recorded for each of the tracks 40 (1–10). The detection status for each energy beam, the precise location of the cart 103 relative to the vehicle and the precise azimuthal and equatorial angles associated with each energy beam is recorded for each of the substantially uniformly spaced positions relative to vehicle 38 as cart 103 is moved on track 1 in envelope 56. After completing the full pass on track 1, the process just described is repeated for each of the remaining tracks 40. Normally, for future use, the relative location of the beam source 42 and vehicle 38 are recorded in the form of an x and y coordinate system, along with the equatorial and azimuthal angles of the beam source 42, in the detection status for each of the beams 66.

After the first set of data is recorded in the manner just described, the beam source 42 is rotated about its horizontal axis to view the next sector, which in this case is sector C. The cart 103 is then moved along each of the tracks 40 and another set of data is taken, as previously described, following which the beam source 42 is successively moved to view sectors B and A where similar sets of reflection data are recorded After the beam source has been rotated through each of the sectors A–D for a given azimuthal angle, the beam source 42 is rotated to a second azimuthal angle so as to view, for example, that portion of the vehicle 38 at a lower elevation designated by the numeral 2. The beam source 42 is then successively indexed to differing equatorial angles to view sectors A–D for the second azimuthal angle, and the reflection data are recorded for each combination of these equatorial and azimuthal angles. In a similar manner, this same recording process is carried out for each of the additional azimuthal angles, which correspond to elevations 3 and 4 in FIG. 5, where the beam source 42 is swung about its horizontal axis to permit recording of reflection data in each of the four sectors A–D. It may be readily appreciated that each set of reflection data may very well be different than the other sets since, due to the incremental movement of the cart 103, the angle of incidence on the various reflective features of the vehicle 38 is slightly changed. For example, as shown in FIG. 8, the vehicle 38 is disposed at a particular relative position where a particular surface feature designated by the numeral 114 is coincidentally disposed at an angle substantially perpendicular to rays 116 of the beam 66d. As a result, the rays 116 incident on surface feature 114 are reflected back toward the beam source 42 and are detected by the corresponding photosensor 84 as a reflection. In contrast, it may be seen that the rays, e.g. 112, of the other beams 66a, 66b, 66c, 66e, 66f are incident on surface features which are inclined relative to the beam source 42 at an angle such that the incident light energy is reflected in a direction which may prevent detection thereof by photosensors 84 if there is otherwise insufficient diffuse reflection from the surface, as may be the case with a clean black car.

FIG. 7 illustrates the alignment of the bank of beams 66 along a substantially horizontal axis 108, four of such beams 66a–66d being shown incident on the door of the vehicle 38. From this figure, it may be seen that beam 66d is incident on the door handle 106 of the vehicle 38 which may possess surface areas of various angular dispositions that may increase the likelihood that a portion of the energy in beam 66d is reflected back toward and is detected by the corresponding photosensor 84. The successively lower elevational positions of the beam bank are designated by the numerals 2, 3 and 4 in FIG. 7, these elevational positions being determined by the azimuthal angle of the beam source 42.

It may be readily appreciated that the reflection data determined in the manner described above can likewise be recorded by other techniques and sequences of relative movement between the beam source and the vehicle 38. For example, the beam source 42 may remain stationary, and the vehicle 38 may instead be moved to successive positions in a plurality of linear paths at successively greater lateral distances from the cart 103, and in this manner, a set of data would be produced which is identical to that previously described. It is preferable to linearly move the beam source 42 to successive incremental positions, rather than the vehicle 38, since the beam source 42 is easily mounted on cart 103 which is more precisely indexed and displaced relative to the vehicle 38. Likewise, the sequence of indexing the beam source 42 to various azimuthal and equatorial angles could be altered. For example, for a given incremental position of the vehicle 38, the beam source 42 might be rotated to successive azimuthal positions for each selected equatorial position. It is only necessary to have the required relative movement between the beam source and the vehicle 38 so as to determine the precise points in the envelope of space 56 at which reflections are obtained from various surface features on the vehicle 38.

After a set of reflection data is obtained for a vehicle 38 of a given configuration, the process is repeated to obtain a second set of data for a vehicle of a differing configuration. This is necessary since the reflective features of vehicles differ depending upon the physical geometry, size and choice of materials used in the vehicle. It is known, however, that certain types of vehicles possess surface geometries which are more difficult to detect for use in generating reflection data which is subsequently used to determine the number and displacement of sampling beams.

Figure 9:
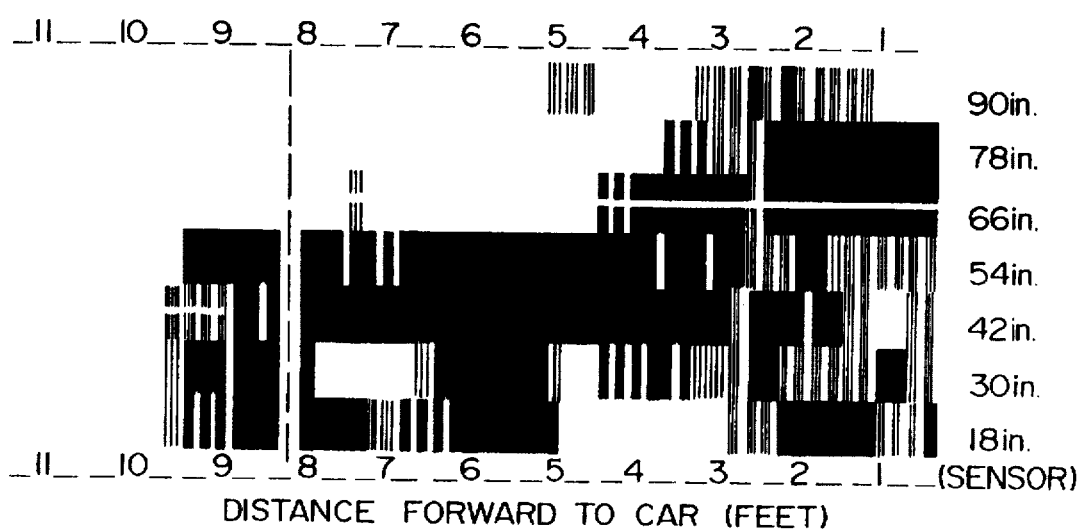
FIGS. 9–11 are reflective feature maps for a first vehicle, respectively representing the detection of reflections at various heights about the ground.
Figure 10:
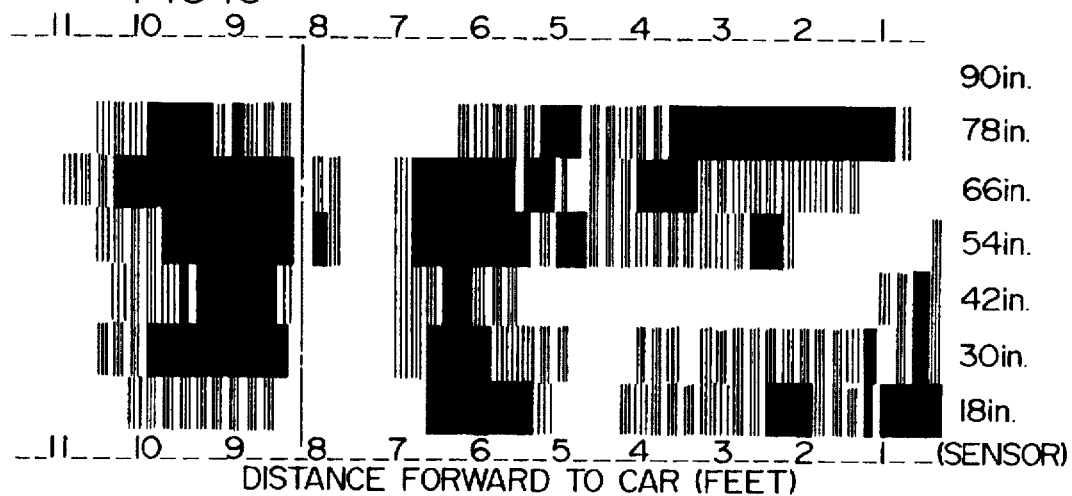
Figure 11:
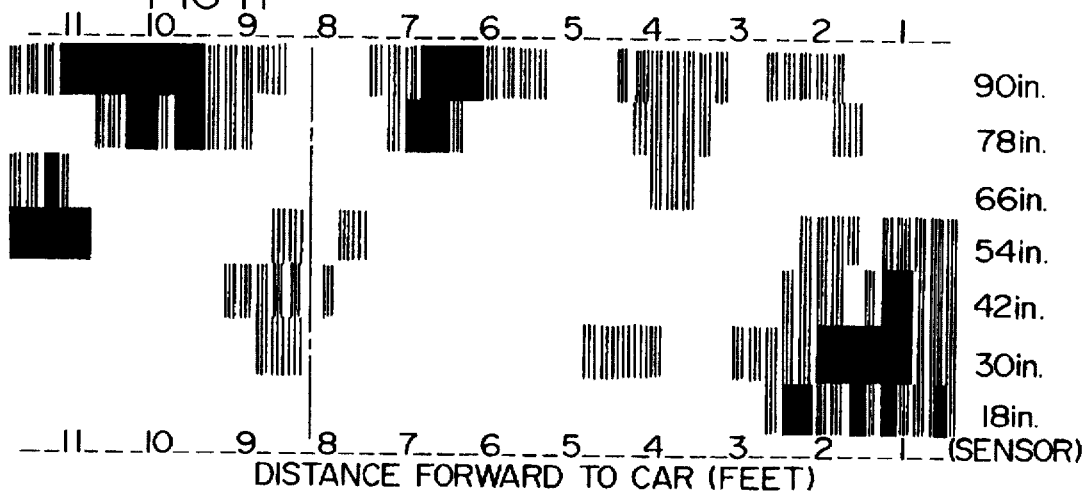

Having generated the necessary sets of data, such data can be plotted to effectively provide a map of the points in the envelope space 56 at which "detections" may be obtained for a given vehicle model. For example, FIGS. 9–12 are plots or "maps" of detections for a 1988 Pontiac Fiero which is black in color. The ordinate depicts the lateral distance from the beam source 42, which of course corresponds to the lateral distance from the detector 20. Also, it can be appreciated that the vertical plots are divided into seven tracks which correspond with the lateral, parallel tracks 40 shown in FIG. 4. The abscissa is a plot of the distance from the beam source 42 (or detector 20) to the front of vehicle 38 in a direction forward towards the leading edge of the envelope 56 (or zone 26) which is indicated as a vertical, dotted line. These plots are based on a four-level gray scale, with the totally white spaces indicating no-detects and the totally dark portions indicating four or more detects at any given x-y position. FIGS. 9–11 respectively correspond to the data recorded for three different elevational (azimuthal) positions, with FIG. 9 being the lowest position, FIG. 10 being at a middle position, and FIG. 11 being at an uppermost elevational position. It can be seen in FIG. 9 that the low beams fail to detect the vehicle at the upper left region of the zone due to he fact that they are aimed under the rear bumper at long ranges. It can also be seen that there is a strong area of response beyond the leading edge of the zone (vertical dash line) due to the very high reflectivity of the rear license plate of the vehicle.

FIG. 10 shows that the middle height beams fail to detect the "test" vehicle in some parts of the middle zone because they sometimes all fall on body panels which are poor diffuse reflectors, such as black panels, and which have such unfavorable angles of incidence as to prevent the return of specular (i.e. mirror-like) reflections. Again, there is a substantial response forward of the leading edge of the zone due to the high reflectivity of the license plate of the test vehicle.

FIG. 11 demonstrates that the highest position of the beams are useful mainly for detecting at the outer lateral boundaries, as well as at relatively close distances, particularly near the beam source (or detection unit 20).

Figure 12:
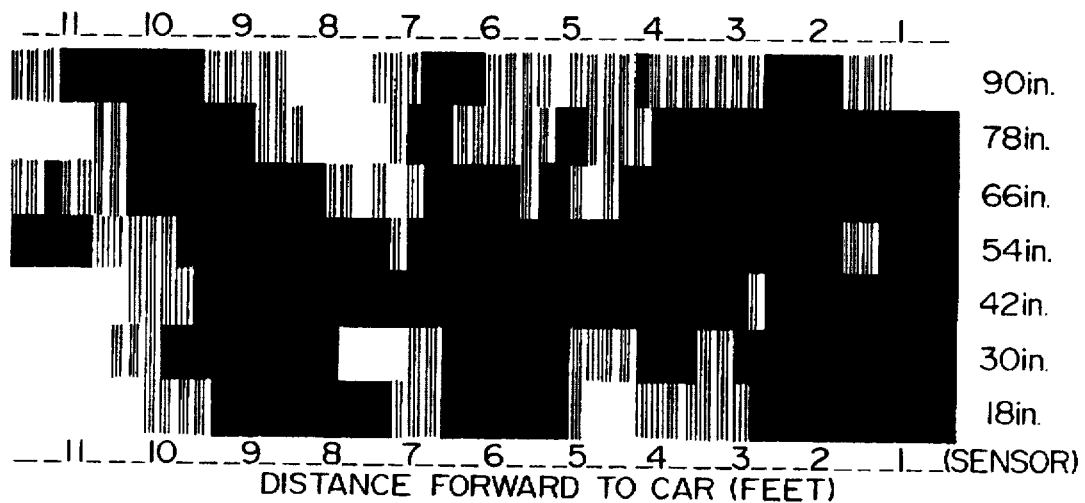
FIG. 12 is a map forming a composite of the maps of FIGS. 9–11.

FIG. 12 is a detection map which forms a composite of those shown in FIGS. 9-11, showing the detection responses for all of the beams at all of the chosen azimuthal elevations for the forwardmost sector of the envelope of volume 56. From FIG. 12, it was determined that a subset of only ten of the total number of thirty-six beams that were used to generate the reflection data were needed to effectively cover the forward quadrant and could do so with less undesired response resulting from the highly reflective areas of the test vehicle forward of the leading edge of the zone being monitored.

Figure 13:
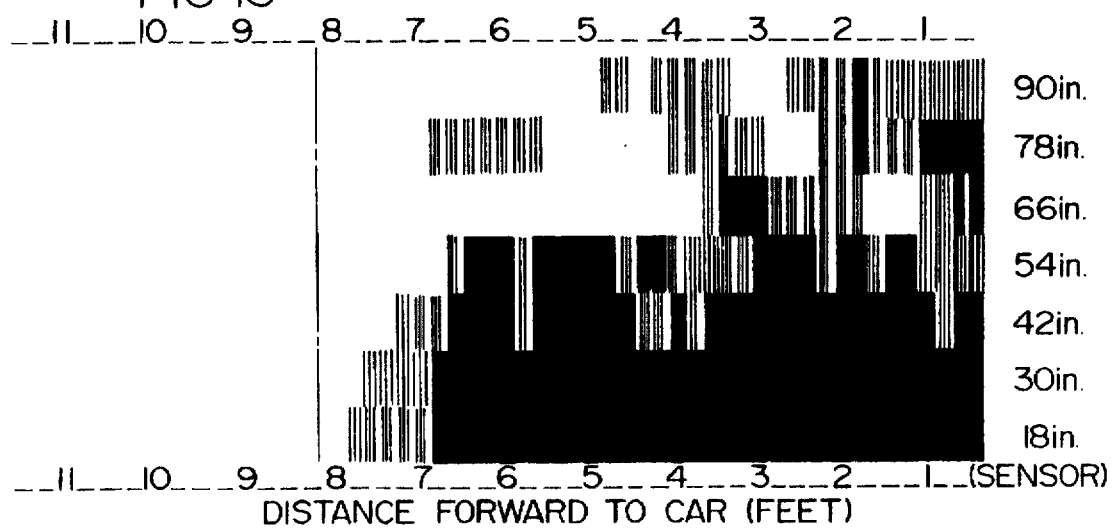
FIGS. 13–15 are reflective feature maps for another vehicle, respectively representing the detection of reflections at various heights about the ground.
Figure 14:
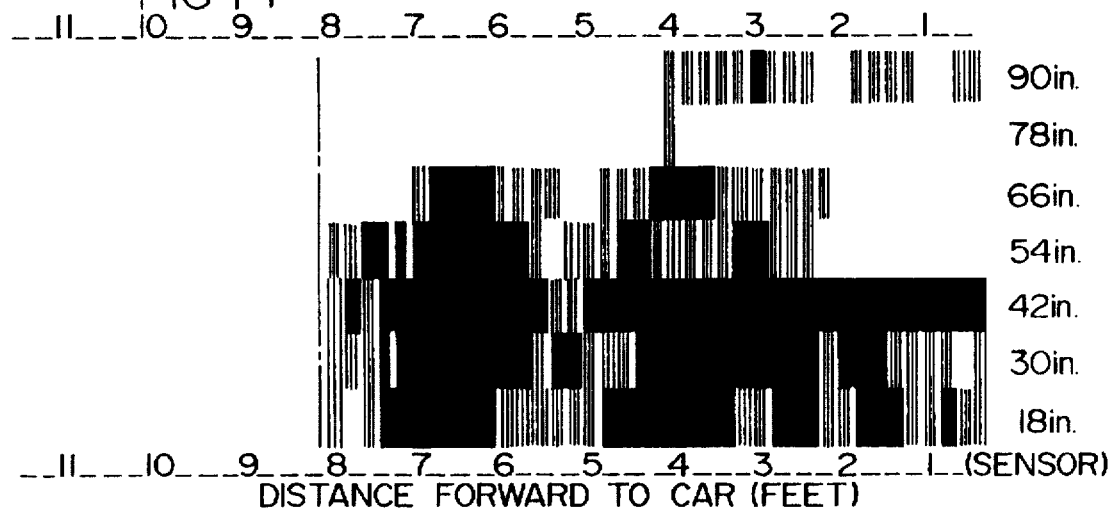
Figure 15:
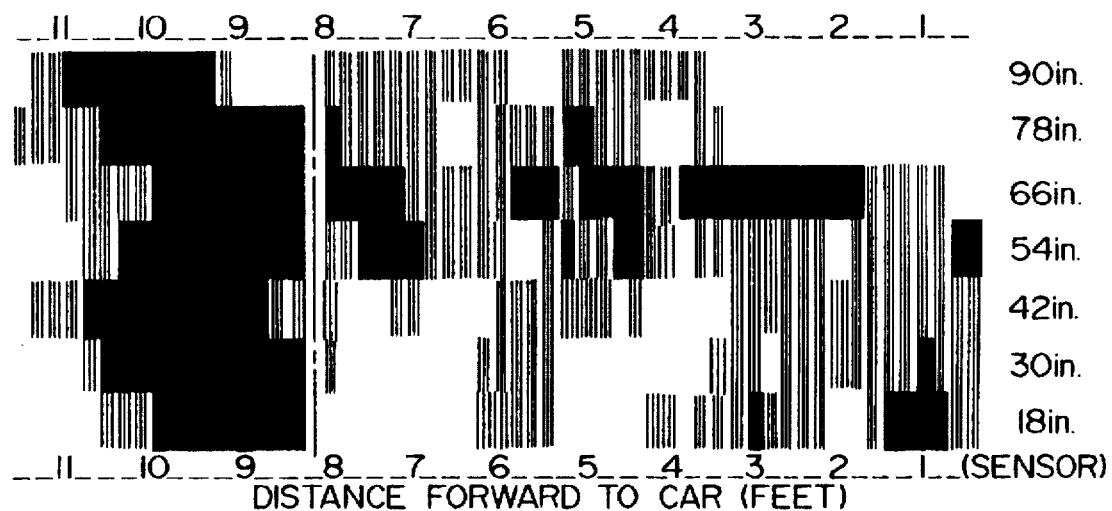
Figure 16:
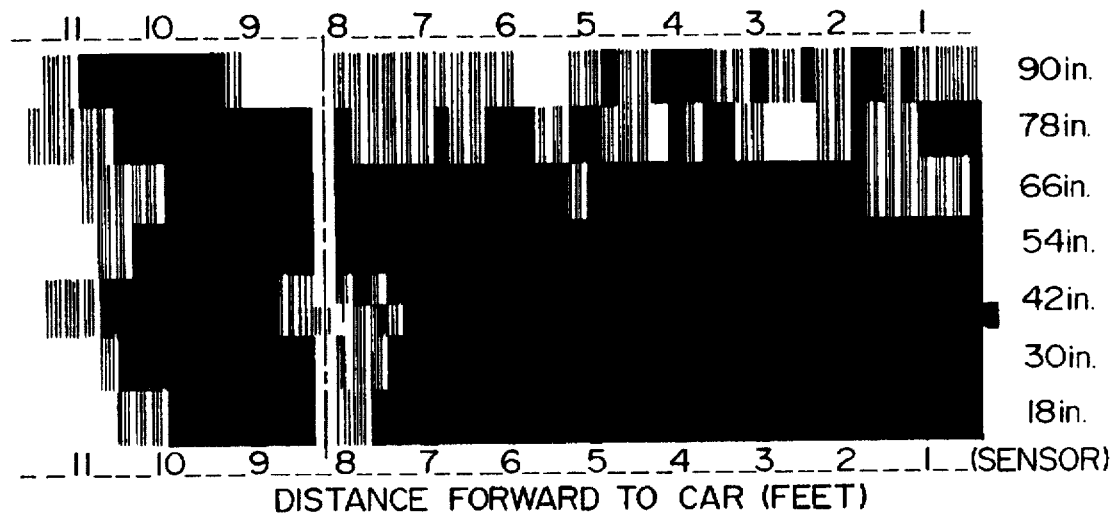
FIG. 16 is a map forming a composite of the maps of FIGS. 13–15.

FIGS. 13-15 are similar to FIGS. 9-11 but depict the detection data for a 1988 Ford EXP which is black in color. FIG. 13 shows that, compared with the Fiero, there is less response at long ranges, due apparently to the relatively high position of the license plate on the Ford EXP. All of the beams fall under the plate at long ranges. FIG. 14 shows that there is less response at the longer lateral distances compared to the Fiero, most probably due to the absence of reflective trim or side reflectors on the Ford EXP. FIG. 15 shows that the higher beams used to generate the detection data in this particular map are sufficiently high in elevation to detect the comparatively high license plate of the Ford EXP forward of the leading edge of the detection zone. FIG. 16 is a map of the detection responses which is a composite of the maps of FIGS. 13-15. From FIG. 16, it can be concluded that the set of ten beams which were effective for detecting Fiero are likewise very effective for detecting the Ford EXP.

Figure 17:
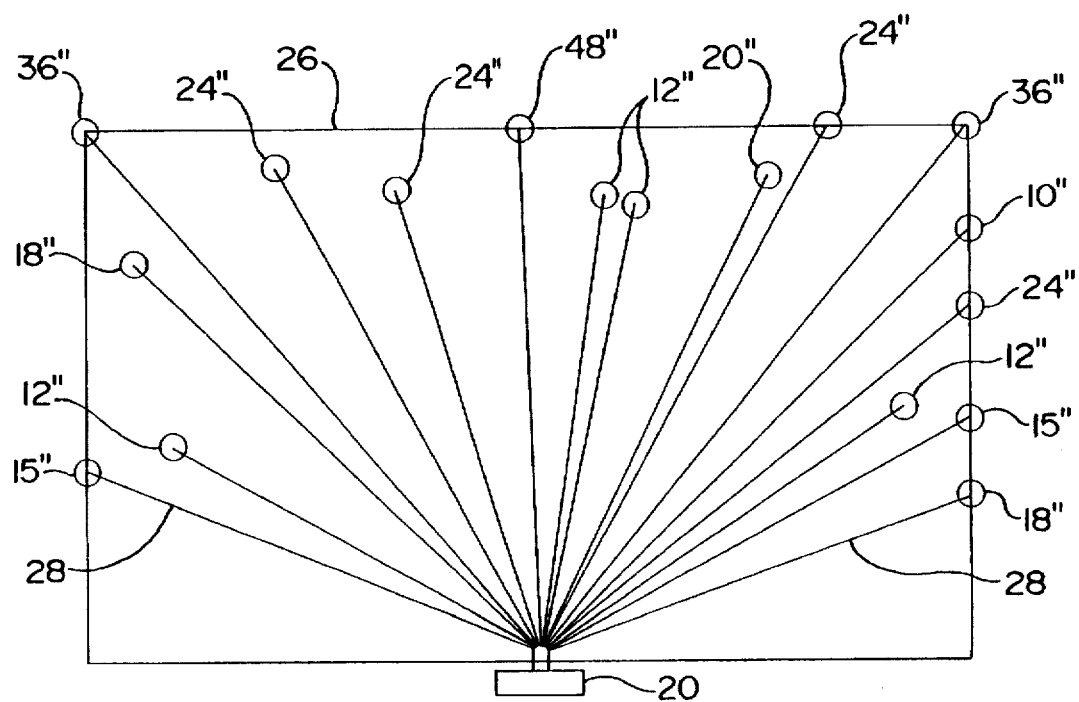
FIG. 17 is a diagrammatic, plan view showing the optimal number and placement of a plurality of detection beams based on the reflective feature maps.

Using the recorded test data and detection maps such as those described above, the final number, positioning and length of the sampling beams may be determined. A typical set of such beams indicated by the numeral 28 are shown in FIG. 17. FIG. 17 depicts the relative angles of the beams as well as their heights and lengths.

Figure 18:
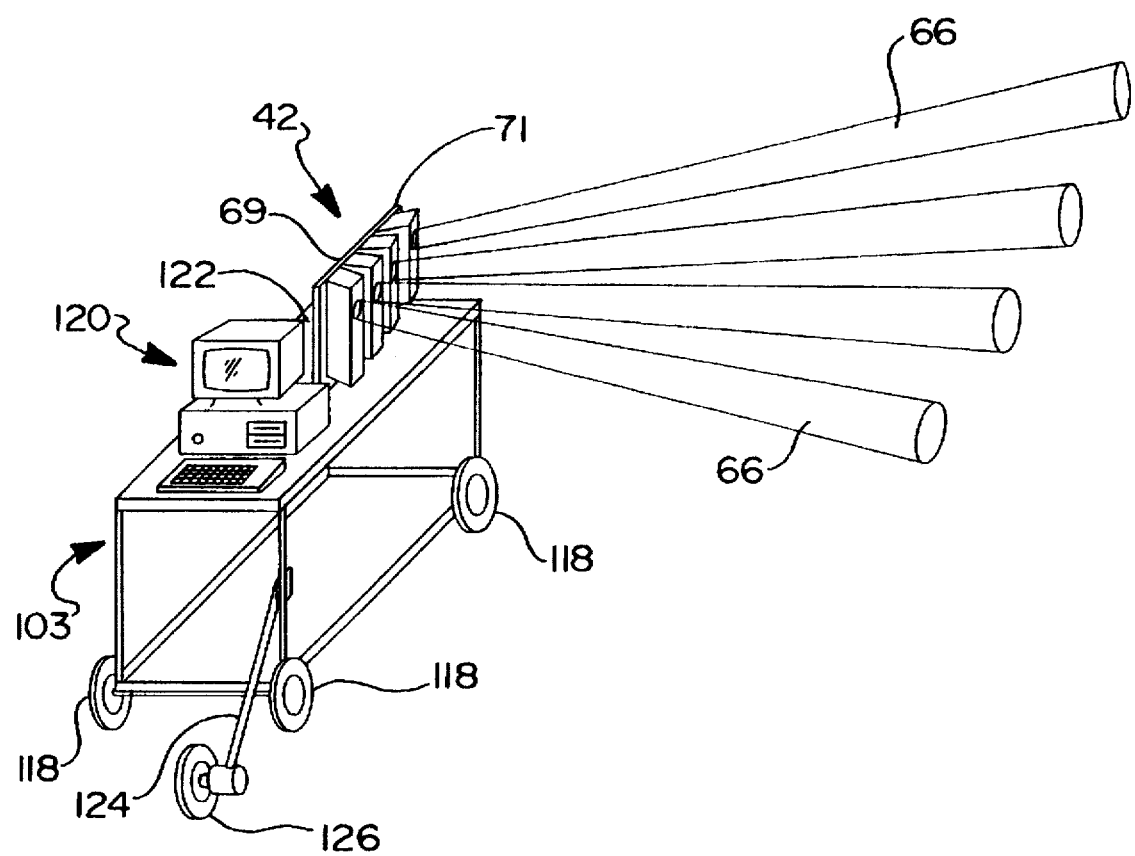
FIG. 18 is a perspective view of a cart used to develop detection data in accordance with the methods of this invention.
Figure 19:
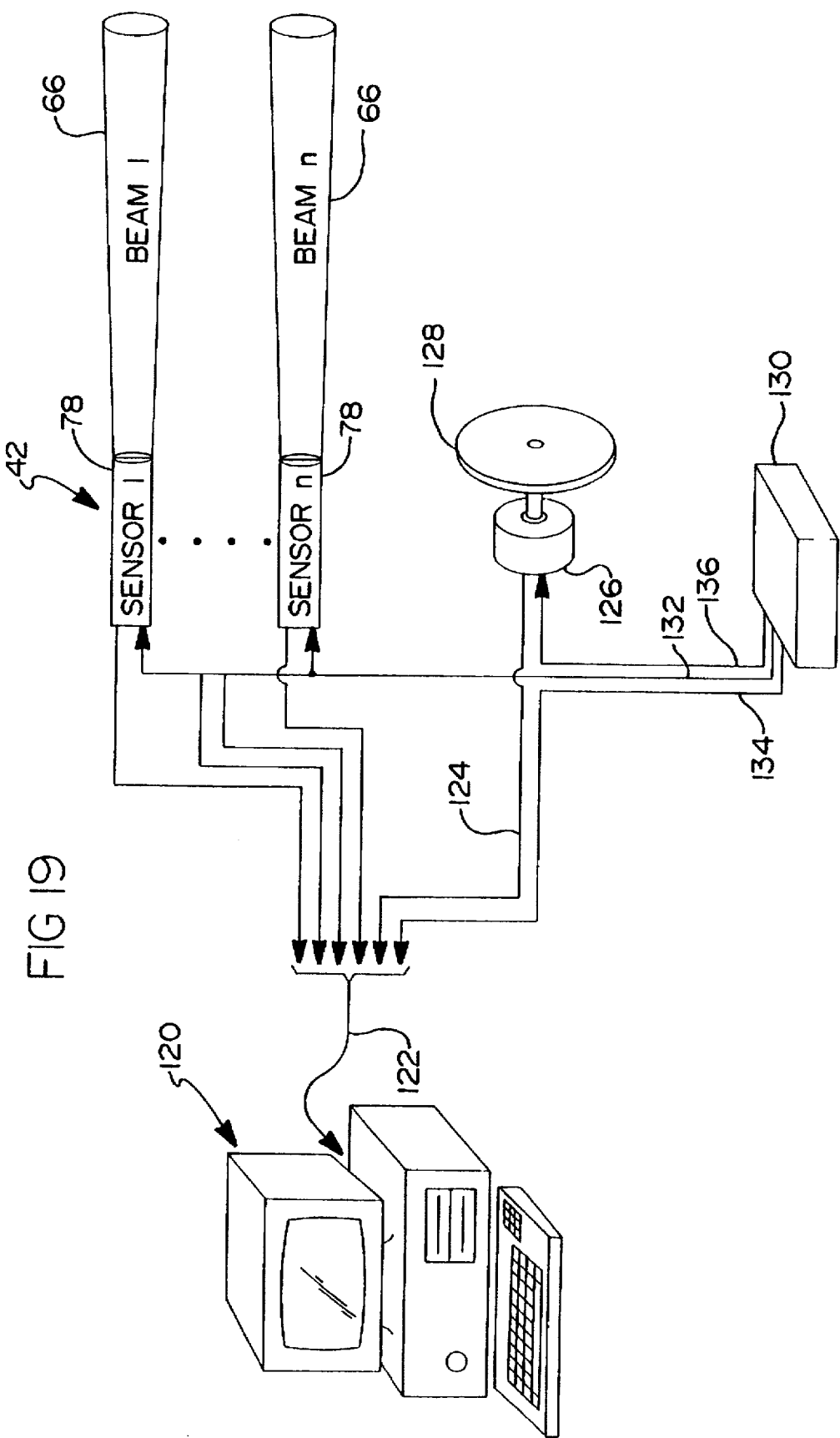
FIG. 19 is a diagrammatic view of the apparatus used in performing data acquisition for producing the maps illustrated in FIGS. 9–16, according to this invention.

Referring now to FIGS. 18 and 19, cart 103 has wheels 118 to enable movement of beam source 42 as described above. Cart 103 also mounts a computer 120 which has a connection 122 to the modules 69, 71 and a connection 124 to a pulse encoder 126 driven by a wheel 128. A power supply 130 supplies power to beam source 42, computer 120 and pulse encoder 128 via lines 132, 134 and 136.

As previously stated, beam source preferably comprises LED and photodetector pairs, although the methods disclosed herein are equally applicable to ultrasonic, radar, laser and other beam systems. The output from the beam reflection sensors is "logic compatible", i.e. it produces high voltage in one state of detection (either detect or no detect), and low voltage in the other state of detection. "Logic compatible" includes TTL, HCMOS or other derivative logic family marketed by numerous chip manufacturers.

Pulse encoder 126 produces a fixed number of pulses per rotation of wheel 128 to control the LEDs to produce beam pulses at regular intervals of cart travel. Such pulse encoders, or incremental encoders are commercially available from such firms as Litton and Varitech. Power supply 130 provides operating voltage to the components mounted on cart 103 and may derive via extension cord from 110 VAC or from batteries carried on the cart.

Computer 120 is preferably a personal computer (PC) in the form of any commonly available 486 or pentium DOS or Macintosh PC. It has a CPU, disk drive, keyboard, monitor and parallel port interface, such as the standard parallel printer port. The detect/nondetect output signals from the beam source 42 are transmitted to the computer parallel port. A program written in any of the available program languages (e.g. C, Basic, Pascal) for data acquisition will access this received beam source output signal data and pulse output data (cart location), as shown in FIG. 20.

To record data, the cart is positioned on and is slowly pushed along each track, as previously described. As the cart moves a constant stream of data is fed to the data acquisition program. The computer monitors and counts the pulses from the pulse encoder. At each pulse point along the track and at some predetermined interval related to the predetermined pulse count, the computer reads the current state of each output from each sensor (i.e. detect or nondetect) and writes the data to a disk file.

This process is repeated for each track until all data are taken from the envelope 56. The sensor pairs are then repositioned to a new predetermined orientation and the data gathering process is repeated. This data gathering process continues until all sensor positions on all tracks in envelope are collected. Then the data file is closed and saved to a disk for later analysis. The entire process is repeated for as many different vehicles as needed.

Figure 20:
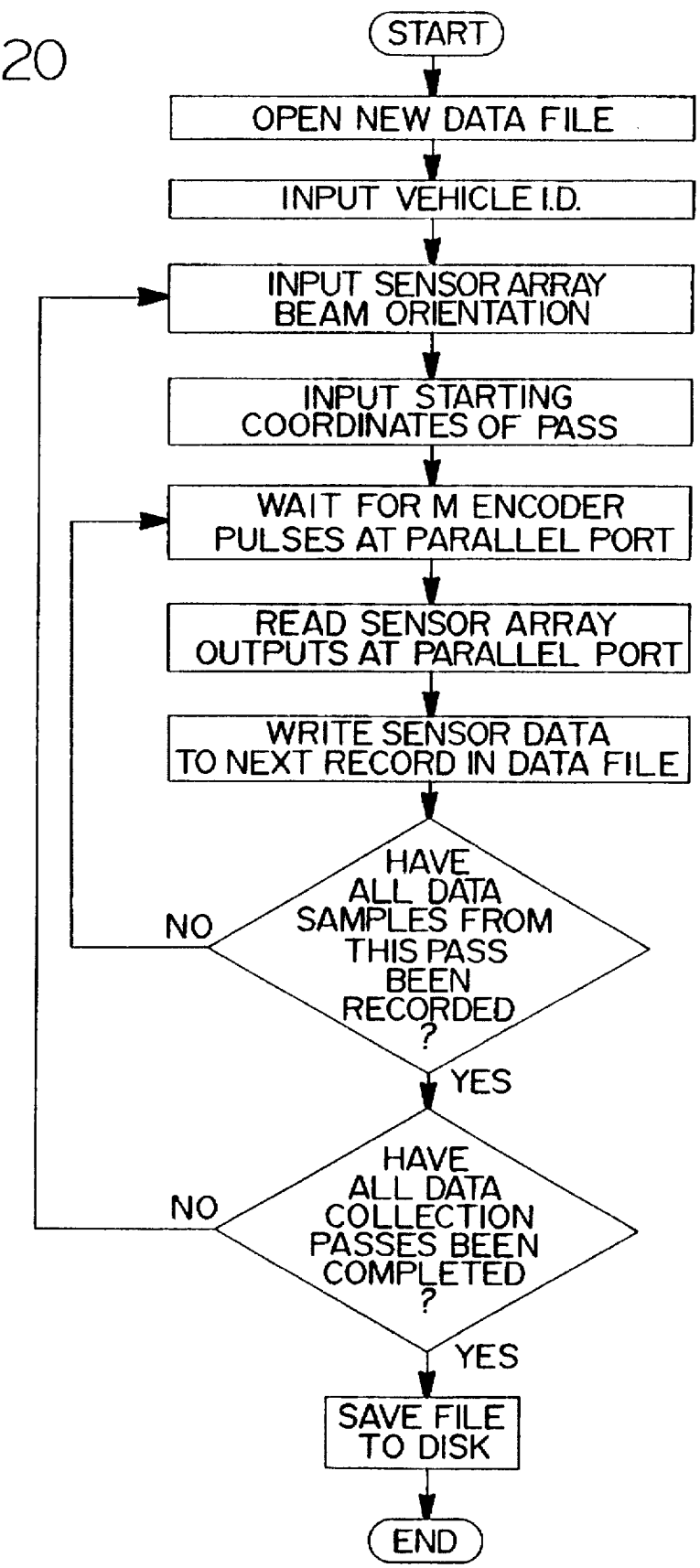
FIG. 20 is a flow chart illustrating operation of the data collection apparatus to create a data file for subsequent use in producing the reflective feature maps of FIGS. 9–16 are made.

The maps illustrated in FIGS. 9-16 are made with the aid of computer 120, as shown in the flow chart of FIG. 20. For each vehicle, the computer program scans through the data file and first orders the sensor beams by number of vehicle detections and determines which single sensor beam had the most vehicle detections within the surveillance envelope 56. The computer then reorders the data file to determine which remaining sensor beam has the most vehicle detections which are not duplicates of the detections of the first chosen beam. This process is repeated for all vehicles tested. Of course, operator judgment must aid the computer selection process when extraneous factors are considered.

A detection map may be plotted for a single beam or for a beam ensemble at a single track position (i.e. relative position of the target vehicle and the beam source 42). The physical maps of FIGS. 9-16 are produced by plotting a dark square centered on coordinates representing the physical data collection points which yielded a vehicle detection. If a map is being produced for a beam ensemble, the process is the same, except that for redundant detection points (i.e. those points where two or more beams yielded a detection), the square is plotted again so that it is progressively darker as the number of detections increases. The resulting map will thus provide additional information for analysis in determining which beam locations are optimal for a particular sensor system being designed.

Thus, this invention provides a method of defining a sensor system for detecting an object within a volume of space under surveillance by determining the optimal number and placement of a plurality of energy beams. Furthermore, it provides a method for quantifying the performance of a sensor system used to detect the presence of an object within a space under surveillance by using mapping techniques to determine the aggregate detection coverage within the space under surveillance.

Various modifications or additions to the preferred embodiments of the invention can be made without departing from the spirit and scope of this invention. Accordingly, it is to be understood that the protection sought and to be afforded hereby should be deemed to extend to the subject matter claimed and all equivalents thereof fairly within the scope of the invention as defined by the following claims.

We claim:

1. A method of determining the optimal positions for a plurality of energy beams directed into a volume of space under surveillance to detect the presence of an object within that space, comprising the steps of:

(A) placing the object at a preselected position within the space;

(B) directing a plurality of sample beams of energy, which have a predetermined orientation, from a source onto the object;

(C) detecting the sample beam energy reflected from points on the object by energy detectors;

(D) recording the preselected position of the object, the predetermined orientation of sample beams, and the detection status of the energy detectors;

(E) moving the source of the sample beams relative to the object;

(F) repeating steps (B) through (E) to produce spatial maps of the locations at which the object is positioned when each of the energy detectors detect reflected sample beam energy; and (G) using the spatial maps so produced to select the optimal orientation of a set of energy beams which will maximize the detection probability of an object located in the volume of space under surveillance.

2. The method of claim 1, wherein step (B) is performed by:

simultaneously training a group of said sample beams onto said object, and angularly displacing said group of said sample beams about a reference axis to each of a plurality of angular positions, and repeating steps (C) and (D) at each of said angular positions.

3. The method of claim 1, wherein step (E) is performed by linearly displacing said source of said sample beams relative to said object to each of a plurality of sampling positions, there being a set of said sampling positions corresponding to each of said angular positions of said object.

4. The method of claim 1, wherein step (E) is performed by linearly displacing said source of said sample beams relative to said object along a first reference path.

5. The method of claim 4, wherein step (E) includes displacing said source of said sample beams relative to said object in a direction transverse to said first reference path to each of a plurality of transversely spaced apart locations, and linearly displacing one of said source relative to said object along each of a plurality of reference paths extending parallel to said first path, wherein said plurality of reference paths respectively extend through said plurality of transversely spaced apart locations.

6. The method of claim 1, wherein step (E) is performed by angularly displacing said source of said sample beams to each of a plurality of angular positions.

7. The method of claim 6, wherein said source is angularly displaced about a substantially horizontal reference axis such that said sample beams are directed onto said object at a plurality of different elevations respectively associated with and angular positions.

8. The method of claim 7, wherein step (E) further includes linearly displacing said source relative to said object along a preselected path for each of said angular positions.

9. The method of claim 1, wherein steps (A) through (F) are repeated for a plurality of objects.

10. A map of the locations in a volume of space under surveillance, where an object is detected by detecting reflections of at least one sample beam of energy directed into the volume of space by a sensor system located at a reference area, produced by (A) placing the object at a predetermined location within the volume of space;

(B) locating the sensor system at a selected reference area;

(C) directing at least one sample beam of energy waves from a reference area onto the object within the space;

(D) detecting the energy reflected back to the reference area from the object;

(E) recording the reference area and the detection of energy on a map of the space under surveillance;

(F) relatively moving the sensor system and the object to locate the sensor system at a different selected reference area; and (G) repeating steps (C), (D), (E) and (F) a predetermined number of times to create said map.

11. The map of claim 10, wherein step (F) is performed by linearly displacing aid beam source relative to said object along a reference path.

12. The map of claim 11, wherein step (F) includes displacing said beam source relative to said object in a direction transverse to said reference path to each of a plurality of transverse locations.

13. The map of claim 10, wherein step (F) is performed by linearly displacing said beam source relative to said object successively along each of a plurality of parallel spaced apart paths.

14. The map of claim 10, wherein step (D) is performed by rotating said beam source about a substantially vertical axis to each of a plurality of first angular positions.

15. The map of claim 14, wherein step (D) includes rotating said beam source about a substantially horizontal axis to each of a plurality of second angular positions.

16. The method of claim 1, wherein steps (A) through (F) are repeated for each of a plurality of objects, method includes the step of selecting the number and optimal positions of said surveillance beams required to detect the presence of any of said plurality of vehicles within said adjacent space.

17. A method for automating the selection of a subset of possible energy beam orientations from a larger set of possible beam orientations for which data has been acquired, comprising the steps of (A) compiling a list of sample energy beams in relative order according to the total number of detections of beams reflected from an object within the volume of space under surveillance;

(B) selecting the beam having the highest number of detections;

(C) compiling another list of the remaining sample energy beams in relative order according to the total number of detections of beams reflected from an object within the volume of space under surveillance that are non-duplicative of the detections of any selected beam;

(D) selecting the remaining beam having the highest number of detections that are non-duplicative of the detections of any selected beam; and (E) repeating steps (B), (C) and (D) a predetermined number of times to produce a combined detectivity map of all detections of all selected beams.

18. A method of quantifying the performance of a sensor system used to detect the presence of an object in a volume under surveillance, where the object is detected by detecting reflections of at least one sample beam of energy directed into the volume of space by a sensor system, comprising the steps of (A) placing the object at a plurality of uniformly spaced locations within the volume;

(B) directing said at least one of sample beams of energy from the sensor system into the volume;

(C) recording the detection status of the reflections of the beams on a map of the volume for each of the locations within the volume to determine the number of detections; and (D) evaluating the number of detections to quantify the performance of a sensor system.

19. A method of defining a sensing system for detecting the presence of an object vehicle in blind spot of a host vehicle, by determining the optimal placement of a plurality of energy beams which are projected into the blind spot, the reflections of which are detected to detect the presence of the object vehicle, comprising the steps of (A) placing the object vehicle at a preselected position within the blind spot;

(B) directing a plurality of sample beams of energy, which have a predetermined orientation, from a source onto the object vehicle;

(C) detecting the sample beam energy reflected from points on the object vehicle by energy detectors;

(D) recording the preselected position of the object vehicle, the predetermined orientation of sample beams, and the detection status of the energy detectors;

(E) changing the equatorial and azimuthal angles of each of the beams and repeating steps (A) through (D);

(F) moving the source of the sample beams relative to the object vehicle;

(G) repeating steps (B) through (F) to produce spatial maps of the locations at which the object vehicle is positioned when each of the energy detectors detect reflected sample beam energy; and (H) using the spatial maps so produced to select the optimal orientation of a set of energy beams which will maximize the detection probability of an object vehicle located in the blind spot.

20. The method of claim 19 further including the step of repeating steps (A) through (G) for a plurality of different vehicles.

* * * * *